United States Patent Office 3,161,527
Patented Dec. 15, 1964

3,161,527
TREATMENT OF EGG ALBUMEN
Charles F. Smith, Prospect Heights, Ill., assignor to National Dairy Products Corporation, New York, N.Y., a corporation of Delaware
No Drawing. Filed July 26, 1961, Ser. No. 126,898
3 Claims. (Cl. 99—210)

The present invention relates generally to the treatment of edible albumen to reduce the level of viable bacteria therein. More particularly, it relates to the treatment of desugared dried egg albumen to reduce the level of viable bacteria therein.

For some years, egg albumen has been dried to enable the albumen to be stored for relatively long periods of time, and to provide a more economical product for shipment and storage. Drying of liquid albumen is normally carried out by pan or spray drying.

More recently, it has been found that dried egg albumen is improved if the level of sugar in the liquid egg albumen is minimized. This may be accomplished by introducing into liquid egg albumen an enzyme which catalyzes the conversion of these sugars into other compounds. The sugar may also be converted by bacterial or yeast fermentations. An egg albumen which has been treated to minimize its level of sugar will hereinafter be referred to as "desugared egg albumen."

In the commercial manufacture of dried egg albumen, as in any operation in which the shell is removed from the egg, the natural barrier against contamination is lost, and the egg contents are subjected to possible bacterial contamination. The degree of contamination in processing and drying operations is variable and dependent on many factors, but generally can be said to be a function of sanitary practices known to the art. Good sanitation practices result in lesser amounts of bacterial contamination. However, since commercial operations cannot be aseptic, there are always some numbers of bacteria found in commercially prepared egg products.

In this connection, numerous methods of treatment of liquid egg albumen have been used to reduce the level of viable bacteria and other microorganisms in dried egg albumen. Proper control of pH conditions, pasteurization of the liquid egg albumen at temperatures below about 138° F., and the addition of antiseptics have all been used or suggested. However, following any of these treatments, the liquid albumen is held, pumped through pipes and containers, dried, and filled into appropriate containers, and recontamination of the albumen is possible in any of these steps. The most effective type of treatment, accordingly, is at some point near the completion of processing.

In this connection, it is known that the level of viable bacteria in dried egg albumen may be reduced by holding the dried albumen at moderately elevated temperatures for extended periods of time. For example, it is known that holding dried egg albumen between 110° and 140° F. for more than one day will reduce the level of viable bacteria and that holding dried egg albumen at about 120° F. for about 21 days will effect a substantial reduction in the level of viable bacteria and, in particular, will substantially eliminate viable Salmonella bacteria.

However, holding the dried egg albumen for extended periods of time requires extensive storage facilities equipped with heating means. Attempts to decrease storage time requirements by an appropriate increase in the temperature of storage have heretofore resulted in loss of some of the desirable properties of the albumen. In particular, storage of dried egg albumen at temperatures higher than 140° F. has heretofore impaired the performance of the albumen in angel cake baking. It has heretofore been thought that dried egg albumen lost desirable cake baking performance if the albumen was held at temperatures substantially in excess of 138° F., which is the temperature at which denaturation of protein normally is initiated in liquid egg albumen.

It is a primary object of the present invention to provide an improved method for producing dried egg albumen which has a low level of undesired bacteria. A further object of the present invention is to provide an improved method for producing dried desugared egg albumen having a low level of undesired viable bacteria. A more particular object of the present invention is to provide a novel method for producing dried desugared egg albumen having a low level of viable bacteria of the genus Salmonella. Other objects and advantages of the present invention will become apparent from the following description and claims.

Generally, in accordance with the present invention, liquid egg albumen is desugared by fermentation in the presence of a suitable enzyme, bacteria, or by other means, to provide desugared egg albumen. The desugared egg albumen is then dried, in accordance with conventional techniques, to a moisture content of about 8 percent or less. The dried albumen is thereafter subjected to heat treatment in accordance with this invention to reduce the level of viable bacteria therein to the desired degree.

In accordance with the present invention, the desugared egg albumen, dried to a moisture level of less than about 8 percent, and preferably dried to a moisture level of less than about 7 percent, is heated to a temperature between about 160° F. and 210° F. for approximately only such period of time sufficient to effect the desired reduction of level of viable bacteria.

It is important, in the practice of the present invention, that the desugared egg albumen be dried to a moisture level of about 8 percent or less. If egg albumen comprising appreciably more than 8 percent moisture is subjected to heat treatment in accordance with the present invention, the properties of the resultant product are undesirably affected, and, in particular, cake-baking performance is impaired.

Another factor which is significant in the practice of the present invention is the extent to which sugar is removed from the egg albumen. In this connection, best results are obtained if the Somogyi test for reducing sugars produces a negative result.

If it is desired to substantially eliminate viable Salmonella bacteria, the dried egg albumen is maintained at 160° F. for about 8 hours, or at 210° F. for about one hour, or at intermediate times and temperatures. The proper treatment times for temperatures intermediate 160° F. and 210° F. can be readily determined by those skilled in the art.

Egg albumen which has been dried to a moisture level of less than about 8 percent in accordance with the present invention has heat insulating properties. As a result, if the dried egg albumen is heated to the above-indicated temperatures and packaged in bulk containers, or otherwise stored in bulk, the albumen retains heat for considerable periods of time, even though the container is stored at ambient temperatures. Accordingly, the viable bacteria level of egg albumen packaged in this manner will continue to be reduced until the temperature of the albumen has decreased below pasteurization temperatures. Consequently, following heat treatment in accordance with the present invention, further desirable reduction of viable bacteria level may be obtained, but it should be understood that further storage at elevated temperature is not necessary and ordinarily will not be used.

EXAMPLE I

As an example of the practice of the present invention, liquid egg albumen was inoculated with a starter comprising bacteria of the genus Aerobacter, and the inoculated albumen was allowed to ferment at about 96 °F. for about 6 hours. At the end of this time, a negative result was obtained by the Somogyi test for reducing sugars.

The desugared egg albumen was cooled to about 50° F., and thereafter was dried in a spray dryer to a moisture level of about 7 percent. The temperature of the dried egg albumen in the dryer was maintained below about 140° F.

The dried egg albumen was sifted, and thereafter was conducted onto a stainless steel bed, which bed was maintained at a temperature of about 210° F. by the circulation of hot water therethrough. The bed was oscillated so as to urge the dried egg albumen along the surface of the bed, and so as to induce intermixing within the layer of dried egg albumen.

The average residence time of the dried egg albumen on the heated bed was about 3 minutes, and the dried egg albumen was discharged from the heated bed at an average temperature of 180° F.

The dried and heated egg albumen was then packaged into cylindrical paperboard containers.

The containers filled with albumen were thereafter introduced into the interior of a tunnel which was maintained at a temperature of about 185° F. by the circulation of air therethrough. The containers were held in the tunnel for two hours, and were thereafter placed in storage facilities maintained at ambient temperatures.

Samples of the albumen were taken at various points in the foregoing process, and bacterial counts were made on each sample. Table 1 summarizes the data obtained from these samples.

*Table 1*

| Sample | Bacterial Count (Organism/gm. albumen @ 7% moisture) | |
|---|---|---|
| | Total | Salmonella |
| Inoculation Liquid Albumen | $1 \times 10^9$ | 1.5 |
| Desugared Liquid Albumen | $66 \times 10^7$ | 5,000 |
| Dried Albumen | $35.8 \times 10^6$ | 110 |
| Heated Albumen from Bed | $8.7 \times 10^5$ | 75 |
| Packaged Albumen from Tunnel | $3.9 \times 10^2$ | Less than 0.03 |

The dried egg albumen processed in accordance with this method was used in preparing angel cakes, and the heights of these cakes were compared to the heights of cakes prepared from albumen which had not been heat treated. The heights of the former cakes were 135 to 143 millimeters, while the heights of the latter (control) cakes were 138 to 141 millimeters. The cakes were comparable in texture and body, indicating that the cake-baking characteristics of the dried egg albumen prepared in accordance with the present invention were fully as desirable.

EXAMPLE II

A a further example of the practice of the present invention, the same materials and procedures were used as were used in Example I, except that the packaged egg albumen was removed from the heating tunnel after one hour, and thereafter allowed to cool to ambient temperatures. Samples of the albumen were again taken at various points, and bacterial counts were made on each sample. Table 2 summarizes the data obtained from these samples.

*Table 2*

| Sample | Bacterial Count (Organisms/gm. albumen @ 7% moisture) |
|---|---|
| Inoculated Liquid Albumen | $1 \times 10^9$ |
| Desugared Liquid Albumen | $66 \times 10^7$ |
| Dried Albumen | $35.8 \times 10^6$ |
| Heated Albumen from bed | $18.7 \times 10^6$ |
| Packaged Albumen from Tunnel | $48.5 \times 10^3$ |

Thus there has been provided an improved method for reducing the level of viable microorganisms in dried egg albumen. In accordance with the present invention, extensive heated storage facilities are not necessary to obtain desirably low bacterial levels. Treatment may be carried out in an in-line operation, resulting in manufacturing economies.

Various modifications of the foregoing treatment will be apparent to those skilled in the art. For example, while particular mechanical means have been described in connection with heating and handling the albumen, it should be understood that various other means may also be utilized, in accordance with the art.

Various features of the present invention are set forth in the following claims.

What is claimed is:

1. A method for reducing the level of viable bacteria in dried egg albumen, comprising the steps of fermenting liquid egg albumen to minimize its sugar content, drying the albumen to a moisture level of less than about 7 percent, and subjecting the dried albumen to temperatures from about 160° F. to about 210° F. for about 8 hours at the lower temperature and about one hour at the higher temperature.

2. A method for reducing the level of viable bacteria in dried egg albumen, comprising the steps of fermenting liquid egg albumen to minimize its sugar content, drying the albumen to a moisture level of less than about 7 percent, and subjecting the dried albumen to a temperature of about 180° F. for about two hours.

3. A method for reducing the level of viable bacteria in dried egg albumen, comprising the steps of fermenting liquid egg albumen to minimize its sugar content, whereby a negative result is obtained using the Somogyi test for reducing sugars, drying the albumen to a moisture level of less than about 7 percent, and subjecting the dried albumen to a temperature of about 180° F. for about two hours.

References Cited in the file of this patent

UNITED STATES PATENTS 3,076,715   Greenfield _____ Feb. 5, 1963

OTHER REFERENCES

Kline et al.: Food Technology, 1951, pages 90–94.